United States Patent Office 3,790,647
Patented Feb. 5, 1974

3,790,647
OZONE TREATED PHENOLIC POLYMER TACKIFIER FOR ETHYLENE PROPYLENE DIENE RUBBERS
Kornel D. Kiss, Easton, Pa., George S. Mills, Boonton, N.J., and Edwin M. Smolin, Easton, Pa., assignors to GAF Corporation, New York, N.Y.
No Drawing. Continuation of abandoned application Ser. No. 19,072, Mar. 12, 1970. This application Mar. 28, 1972, Ser. No. 238,964
Int. Cl. C08f 37/18
U.S. Cl. 260—897 R    5 Claims

ABSTRACT OF THE DISCLOSURE

The reaction products of ozone and a compound selected from the group comprising alkyl substituted phenolacetylene resins, alkyl substituted phenol-aldheyde type resins and resins of natural origin, a process of preparing same, and a method of use therefore in increasing the building tack in E.P.D.M. (ethyl propylene diene monomer) rubber.

---

This is a continuation of application Ser. No. 19,072, filed Mar. 12, 1970, now abandoned.

The instant invention relates to a novel composition of matter comprsing the reaction products of ozone with numerous resins comprising alkyl substituted phenolacetylene resins, alkyl substituted phenol-aldheyde type resins and resins of natural origin which are useful as rubber tackifiers. That is to say that the products of the process of the instant invention are useful for improving the building tack of rubber and are useful in preparing rubber compositions with high autohesion.

"Building tack" is the surface property of natural rubber which enables two pieces of unvulcanized stock to adhere together when brought in contact under moderate pressure. This phenomenon is specific between two pieces of natural rubber. Such stock will not adhere to other substances such as metal, glass or wood.

This attribute is important not only for rubber stock used in the manufacture of tires but of rubber used in manufactured rubber goods and the like. Uncured compositions of natural rubber such as are used in the manufacture of tires, and the like, are inherently tacky. When two surfaces of natural rubber are pressed together, the two surfaces adhere. This permits assembly of rubber parts in an uncured state which can withstand rough treatment in handling. This property also permits natural rubber to be used in goods wherein a high degree of autohesion is a prerequisite. Sheets of natural rubber have been laminated together to attain a thick sheet of desired dimensions which can be used as molding stock; its inherent tack permits contact lamination. This procedure facilitates immediate preparation of molding stock of various thicknesses.

Synthetic rubers unfortunately do not have this tack. Various expedients have been used to impart tack to synthetic rubbers so that they might be used in instances where tack is a required or desired property. Certain materials, however, may be added to most synthetic rubber stock to impart tack. These substances are called tackifiers. They are not generally effective when added to certain classes of synthetic rubber, i.e., E.P.D.M. (ethylene propylenediene monomer) rubber rendering these rubbers useless for tires and many rubber goods.

It has been unexpectedly found that contacting with ozone an E.P.D.M. rubber containing an alkyl substituted phenol-acetylene or alkyl substituted phenol-aldehyde type resin resulted in activation such that excellent tack resulted. Most rubbers are deleteriously affected by oxygen, ozone, etc. It is therefore unexpected that the reaction product or products of the instant invention provide a means for manufacturing automotive tires employing synthetic rubbers such as ethylene propylene diene monomer rubbers. Furthermore, the resultant products are longer lasting than ones presently available, since E.P.D.M rubber is far less subject to the attack of ozone than other synthetic rubbers. Similarly, where strong cohesive bonding requirements in fabricated rubber articles are required, the subject invention now provides that means not previously available.

The most successful of these expedients previously employed to overcome the above noted disadvantages has been to incorporate into synthetic rubber compositions various polymeric resin compositions which can impart tack to the synthetic rubber.

It has been known heretofore to impart improved tack to synthetic rubbers by incorporating therein additive tackifiers such as rosin, polyterpenes, coumarone-indene resins, substituted phenol-aldehydes, substituted phenolacetylene resins and the like. It is also known that certain novolak resins can be used. However, the degree of tack which these agents impart to E.P.D.M. rubbers is low. In some cases the tack can be improved by using large amounts, thereby increasing the cost of the product and affecting the desirable properties of the rubber.

In accordance with the present invention it has now been found that one may employ a resin in the form of a finely divided solid or in a solution of a solvent of a low order of reactivity to ozone, which resin is subsequently exposed to a gas containing ozone. When a solution ozonide is prepared, it is subsequently coated on an appropriate rubber stock and the solvent evaporated therefrom. When the exposure is via the finely divided resin solid, a solution of the resin is applied to the rubber stock, the solvent allowed to evaporate therefrom, and the finely divided solid on the surface of the rubber stock is then exposed to an ozone containing gas. A further alternative is to incorporate the resin into the rubber stock during compounding and subsequently exposing the stock to ozone. According to the above general method, it is also possible to prepare active tackifiers by exposing resinous material to ozone. In this connection, it is noted that the solution type application process disclosed above is suitable for any synthetic rubber material while the finely divided solid application and the method of incorporation of the resin into the stock, disclosed above, is preferred when employing ozone-resistant rubers inasmuch as ozone has a deteriorating effect on certain rubbers.

The instant invention is useful in connection with three general classes of resinous material. The first group is derived from acetylene/alkyl substituted phenol condensation products. These resins are characterized in that they are thermoplastic and thermostable. A typical resin has a formula corresponding to the following structure:

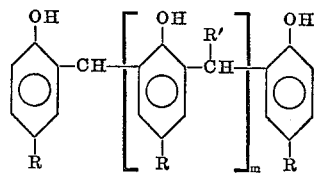

wherein R is preferably but not necessarily a secondary or tertiary alkyl group and R' is H, CH$_3$, or lower alkyl. A particularly suitable resin for use in connection with this class of resins is an alkyl phenol/acetylene oligomer prepared according to the method of United States Pat. No. 2,459,137. The resin which is found to have particular utility and which is disclosed therein is prepared from a tertiary butyl phenol and acetylene and is known to the trade as "Koresin." Another resin which corresponds to the instant class of resinous materials is "CRRB-0709" (Union Carbide Corporation) in which it is believed that $m$ is about 8–10 and R is branched nonyl and R' is H. Yet another suitable resin is "Ambersol ST–137X" (Rohm and Haas Company) in which R is a tertiary octyl group, R' is H and $m$ is about 2.

The second class of compounds to which the instant invention is directed is resins derived from alkyl substituted phenols and aldehydes.

A typical resin of this type has the following general structure:

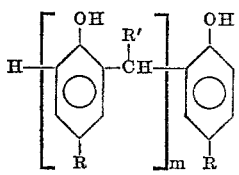

wherein R is preferably but not necessarily a secondary or tertiary alkyl group, R' is H, or a lower alkyl group and $m$ is less than 100. This class of resins include the alkyl phenolformaldehyde novolak resins, and in particular, those in which the p-alkyl group contains from 9 to 15 carbon atoms, resorcinol formaldehyde resins and the like referred to hereafter as rosins.

The third class of resins to which the instant invention is directed are resins of natural origin such as rosin, sandarac, copal and the like. Rosin is the non-steam volatile fraction of pine oleo resin and is a mixture of isomeric diterpene acids. Abietic acid is the most abundant component. It is noted, however, that the remaining natural rosins of this type are not particularly well defined chemical compounds of uniform structure, but rather are mixtures of chemically similar oligomers based on derivatives of abietic acid. It is further noted that the chemical modification of these rosins of natural origin such as by hydrogenation, esterification, and the like does not interfere with their applicability and is intended within the scope of the instant invention. By the process of the instant invention the natural rosins are modified by exposure to ozone so as to obtain the novel compositions disclosed herein.

The term "rubbers" as employed herein includes the rubbery ethylene-propylene copolymeric materials such as ethylene-propylene rubbers, the ethylene-propylene-diene copolymer rubbers and the like.

All the above rubbers are well known. The ethylene-propylene-diene copolymer rubbers are, however, relatively new, and are the preferred materials for use in connection with the instant invention. Similar in composition and properties to the ethylene-propylene rubbers, these rubbers possess sufficient "residual diene" unsaturation to permit sulfur vulcanization, a highly desirable property. These are made in a manner similar to the ethylene propylene copolymer rubbers except that from about one to about twenty percent of a non-conjugated diolefin or diene, is interpolymerized with the ethylene-propylene monomer mixture. Illustrative methods of producing these types of rubbers can be found in United States Pat. 2,933,480, issued Apr. 19, 1960 and British Pat. 880,904, published Oct. 25, 1961.

Natural and reclaimed rubber are often added to standard rubber stock compositions to produce a stock of smooth uniform consistency. Blends of various E.P.D.M.-containing rubbers can of course be used in this invention, particularly desirable of which are blends of natural and/or synthetic rubbers with E.P.D.M. rubber. Generally, conventional type compounding ingredients such as fillers, extenders, vulcanizing agents, pigments and the like can be used in the stock material. We have found, however, that certain additives hinder the development of tack when the compounding method of incorporating the subject compositions into a rubber stock is employed. That is to say, e.g., that tetramethyl thiuram-monosulfide, an accelerator for stock compositions, hinders the development of tack by what is thought to be a physical rather than chemical phenomenon. It is thought that this accelerator migrates to the surface and forms a protective layer on the resin particles so as to render said resin particles less accessible to the ozone.

In general, the process of the instant invention may be employed using a number of different operational modes, illusrative but not limitative thereof. In the first, a starting resin is dissolved in a suitable solvent which is substantially inert to ozone. For example, such solvents include hexane, trichloroethane and the like. The resin is employed in an amount of about 0.2% to about 50% in this method. The resulting solutions of the resins are then converted to active tackifying agents by exposing the solution to ozone or gas containing an appreciable concentration of ozone and subsequently diluting the solution with solvent to provide a concentration range of from about 0.05% to about 5% active tackifying resin. The solution may then be applied to the ethylene-propylene diene monomer rubber stock. The solvent is then allowed to evaporate and the coated surfaces are then placed together so as to provide an improved bonding.

A second mode of operation within the scope of the instant invention comprises the application of the above prepared solution of resin in an inert solvent on to the E.P.D.M. rubber stock surface and subsequently exposing the resulting surfaces to an atmosphere containing ozone. Subsequent thereto the solvent is removed and the treated surfaces are contacted so as to result in an enhanced bonding. In this connection where the ozone is applied directly to the surface of the rubber stock, a rubber stock which is resistant to ozone deterioration must be employed. Particularly suitable in this connection are the ethylene-propylene-diene monomer based stocks.

Still a third method of operation within the scope of the instant invention is to expose one of the above denoted classes of resins in a neat form to ozone. The resultant additive tackifying resin may then be put into a solution and applied to a rubber stock surface.

A fourth method of implementing the objects of the instant invention is to incorporate a resinous material into the E.P.D.M. rubber stock and subsequent to the incorporation thereof, ozonizing contacting surfaces of stock composition containing the resin. It is noted that if this method is employed, the rubber stock material should be highly resistant to the effects of ozone. While the exposure to ozone is mild, rubber stocks not resistant thereto will develop stress cracking. Once again, the preferred rubbers for use in connection with this method is the ethylene-propylene-terpolymer rubbers which are noted for their excellent ozone resistance. The amounts of resin employed in connection with this particular method can vary from about 0.1 to about 20 parts of resin per hundred parts of rubber (p.h.r.). Preferably, about 1.5 to about 7 parts of resin per one hundred parts of rubber are utilized.

While the exact mode of operation of the instant invention is not as of this time known, it has been shown that ozone is a far more desirable tack-developing agent and necessary component of the process and product, than other oxidizing agents such as hydrogen peroxide, nitrogen oxides, chromates, persulfates and free radical initiators in producing an active tackifying resin. Furthermore, the structure of the products which result from the process of the instant invention, i.e., the reaction of ozone with a compound selected from the group comprising alkyl substituted phenol-acetylene resins, alkyl substituted phenol-aldehyde type rosins and resins of natural origin has not as of this time been determined; however, it is known by means of infrared absorption studies that there is an increase of oxygen containing groups such as carbonyl and carboxyl in the resin structure.

In connection with the process of the instant invention, it is also within the scope thereof to include solutions of resinous starting materials in solvents which are inert to ozone. These solutions may have increased viscosity so as to be able to apply the resin solution as a cement as distinguished from a solution. In addition it is also within the scope of the instant invention to include in the adhesive solution a component of synthetic rubber and/or other conventional ingredients either before or after ozonization. In this connection, it is noted that one should preferably avoid the addition of substances which are susceptible to deterioration under the effects of ozone prior to the ozonization process.

The instant invention will now be described by reference to the following examples; the examples are cited merely as illustrative and the invention is not deemed as being limited thereto.

EXAMPLE I 1.4 formula weight masterbatches of the following compounds were prepared in the midget Banbury, preheating the jacket in each case one minute at 65 p.s.i. steam:

|  | Parts by weight |
|---|---|
| Ethylene-propylene diene rubber (E.P.D.M.) with 1,4 hexadiene, ML4 at 250° F.=70 | 100 |
| Furnace black | 80 |
| Naphthenic processing oil | 40 |
| Propionic acid surface coated zinc oxide | 5 |
| Stearic acid | 1 |

Mixing cycle

Start:
 0 time—add E.P.D.M.
 1 min.—add ⅓ black—zinc oxide
 3 min.—add ⅓ black
 5 min.—add ⅓ oil
 7 min.—add ⅓ black—stearic acid
 9 min.—add ⅓ oil
 Steam Banbury 1 minute, full steam
 11 min.—add rest of oil
 13 min.—scrape/brush down chute
 14 min.—stop Banbury The composition was banded on a 6 x 12" 2-roll mill at 70 to 110° F. and scrap oil and black were added. The composition was cut four times on each side to incorporate and blend same. The masterbatch was then end rolled through the mill, 10 passes, then sheeted off for storage. Portions of the above composition were freshened by dropping through a 6" x 12" mill nip, doubled and repassed five times. The batch was then sheeted off to about 0.08" thickness. 33 g. square portions were cut out for pressing. Four cavity frame molds 4½" x 4½" x 0.075, 12" square, were used with steel backing plates. These were preheated at 210–225° F. The sequence of loading each frame mold was:

(a) base backing plate
(b) foot square of aluminum foil
(c) the frame mold
(d) a foot square of No. 409, 2.85 oz. cotton sheeting
(e) the weighed compounds
(f) a foot square of plain uncoated 1½ mill cellophane
(g) a foot square polished chrome ferrotype plate
(h) top backing plate All were reloaded in the foot square platens of a hydraulic press at 210–225° F. The pressure was then slowly raised over four minutes by the dead weight of the handle. Then the pressure was raised, "bumping," at 5, 10, and 15 tons pressure on a 5" ram. The pressure was held three minutes at 20 tons, then the composite was cooled with water below room temperature. On removal, the composite squares were trimmed, and conditioned one hour at 50% relative humidity and 72° F., before cutting into strips.

One inch wide strips of the above composites were then cut with a 10" guillotine belt cutter, and the strips stored, protected from dust, in a 72° F., 50% relative humidity environment.

The cellophane film was removed from the face of the specimen strips, without touching the exposed surface, prior to treatments as described.

The tackifying solution was prepared by dissolving 5 grams of p-tertiary butyl phenol-acetylene condensation product (Koresin) prepared according to the method of United States Pat. 2,459,137 in 100 cc. of dry hexane. Air containing 0.067 mg./l. ozone was bubbled through the solution at the rate of 0.4 l./min. for 1 hour. This solution was diluted with hexane to give the equivalents of 0.25, 0.5 and 1.0 g. of condensation product per 100 ml. of hexane solution. The solutions were then applied to the cellophane-stripped rubber surface of 1" x 4½" rubber specimens with a ½" camel hair brush, using approximately 2½ cc. solution per specimen. The brush was rinsed with hexane subsequent to the use with each sample solution.

The testing was performed on the Instron tester with a crosshead speed of 2" per minute. One inch tabs of polyethylene film were placed at one end of each treated strip. The strips were then carefully place "rubber side" together in parallel, tab-to-tab, and were rolled completely twice, taking about a second to traverse, back-and-forth, with a 25 lb. standard roller. The plied set of strips were immediately mounted by their tabs on to the Instron grips, and the T-peel test started 30 measured seconds after the final rolling in assembly. The stripping was continued to about one-half inch from the end of the assembled sample.

The T-peel test data presented below are presented as pounds pull per inch width and the type of failure is given in the following table:

TABLE 1

| Number | Tackifier applied | T-peel, lbs. in. | Type of failure |
|---|---|---|---|
| 1 | None | 3.2 | Interface separation. Dull surface. |
| 2 | Hexane only | 0.6 | Do. |
| 3 | 0.25 g./100 cc | 11.7 | Cohesive failure.[1] |
| 4 | 0.5 | 12.3 | Do. |
| 5 | 1.0 | 8.2 | Do. |

[1] Cohesive failure of samples in this T-peel type test implies that the observed separation of the plied sample does not occur smoothly at the contact surface interfaces, but roughly, as the contacted rubber compound has welded into one structure at the original interface. Hence, under continued separation tearing and tensile failure of the rubber compound occur randomly, giving variably high numerical values.

EXAMPLE II

Specimens were prepared according to the method of Example I. The resin solution was also prepared according to the method of Example I, by dissolving the resin in the solvent and subsequently applying the solvent solution with a brush to the rubber surface of the specimen at a rate of 0.5 cc. per square inch. The solvent was then evaporated therefrom. The specimen was then exposed to ozone containing air for a specified length of time. Concentrations of the resin and amounts of ozone available are presented in Table 2 together with the results of the T-peel test data which was performed as in Example I.

TABLE 2

|  | 1 | 2 | 3 | 4 | 5 | 6 | 7 | 8 |
|---|---|---|---|---|---|---|---|---|
| Solution composition: |  |  |  |  |  |  |  |  |
| Solvent, type | Hexane | | | —CCl₄— | | Hexane | | |
| Solvent, volume, cc | 100 | 100 | 100 | 100 | 100 | 100 | 100 | 100 |
| p-t-Butyl phenol/acetylene oligomer, g | 1 | 1 | 1 | 1 | 1 | | | .5 |
| Ozone, mg. (in air) | 1.8 | 0.3 | 1.8 | 0.3 | 1.8 | 0.3 | 1.8 | 1.8 |
| Drying time, min | 1 | 10 | 10 | 10 | 10 | 10 | 10 | 10 |
| T-peel, lbs./inch width | 12.8 | 13.4 | 15.3 | 9.1 | 10.7 | 0.07 | 0.14 | 11.7 |
| Type of failure | Cohesive failure | | | | | (¹) | (¹) | (²) |

¹ Separation at surface.
² Cohesive failures.

EXAMPLE III

This example illustrates the use of cements compared to the solutions of Example II.

Test specimens were prepared exactly as in Example I. The composition of the tackifying cements employed and the tack values in the T-peel test are presented in Table 3. Said test was performed according to the method of Example I. The cements were applied on the surface of the specimens at the rate of 0.5 cc. per square inch surface and dried at room temperature. After the solvent has evaporated, the specimens were exposed to ozone containing air. Two specimens were tested in the T-peel test, and the average T-peel strength values recorded.

TABLE 3.—APPLICATION OF OZONIZED RESIN IN CEMENT

|  | 1 | 2 | 3 | 4 | 5 | 6 | 7 |
|---|---|---|---|---|---|---|---|
| Cement composition: | | | | | | | |
| Hexane, cc | 100 | 100 | 100 | 100 | 100 | 100 | 100 |
| p-t-Butyl phenol/acetylene oligomer, g | | 1 | | 1 | 1 | .2 | .1 |
| EPDM of ML 4 at 250° F.=70 | 2 | | 2 | 2 | 2 | .4 | .2 |
| Ozone, mg. (in air) | 9.5 | | 9.5 | 9.5 | 9.5 | 1.9 | 1 |
| Drying time, min | 60 | 60 | 10 | 60 | 60 | 10 | 10 |
| T-peel, lbs./inch width | 1.8 | 1.7 | 1.7 | 18.7 | 12.3 | 12.7 | 9.5 |
| Type of failure | (¹) | (¹) | (¹) | (²) | (²) | (²) | (²) |

¹ Separation at surface.
² Cohesive failure.

EXAMPLE IV

Compounding and preparation of test composites for this example were performed according to Example I with the following modifications:

Composite A was fully compounded by incorporating therein 1.5 parts per hundred parts of rubber (p.h.r.) copper dimethyldithiocarbamate, 0.75 part mercaptobenzthiozole, and 1.5 parts sulfur.

Composite B was made as in Example I with the exception that the extending oil, i.e., the napthenic processing oil was replaced with an equivalent product of a different manufacturer.

Composite C was prepared as in Example I with the exception that said composite contained 1.5 parts copper dimethyldithiocarbamate, 0.75 part mecaptobenzthiozole, 1.5 parts sulfur and the napthenic processing oil of Composite B.

Test specimens were prepared as in Example I. The solutions of tackifying resins were prepared by dissolving 0.25 g. or 0.5 g. tertiary butyl phenol/acetylene oligomer of Example I in 100 ml. hexane.

The tackifier solutions were applied with a brush using approximately 2½ ml. for each specimen and the specimens were air dried for 10 minutes after the solution was applied. The air dried specimens were either tested by the T-peel test or were exposed to ozone. The exposure was performed in a chamber equipped with a small circulating fan and air inlet and outlet tubes. The air was introduced to an ozone generator first at the rate of 0.4 l./min. The ozone content of air leaving the said generator was 0.067 mg./l. This ozone containing air was introduced into the exposure chamber for the length of time specified in Table 4. After the ozone exposure the specimens were tested by the same T-peel test described in Example I.

EXAMPLE V

Resin solutions were prepared by dissolving one g. of the resin indicated in Table 5 in 100 cc. of hexane. The following resins were employed: p-tertiary butyl phenol-acetylene condensation product, substituted phenol-aldehyde resin, a resin designated Synthol (Genseke Brothers), and a rosin natural origin designated Harwick RT-4 (Harwick Chemicals). The resin solutions were applied by a brush and the specimen was air dried. In each instance, each specimen was exposed to air flow of 0.01 CFM (cu. ft./min.) containing 0.067 mg. ozone per minute for exactly 60 seconds, and tested for T-peel strength as in Example I.

TABLE 5

|  | 1 | 2 | 3 | 4 | 5 | 6 | 7 | 8 |
|---|---|---|---|---|---|---|---|---|
|  | Resin | | | | | | | |
|  | (AA) | | (BB) | | (CC) | | (DD) | |
| Ozone exposure, seconds | 0 | 60 | 0 | 60 | 0 | 60 | 0 | 60 |
| T-peel, lbs./in. width | 2.1 | 9.1 | .46 | 7.1 | 2.5 | 5.2 | 1.9 | 13.5 |
| Type of failure | S | C | S | C | S | C | S | C |

NOTE.—S=Separation at interphase; C=Cohesive failure; (AA)= p-Tertiary butyl phenol-acetylene oligomer; (BB)=Substituted phenol-aldehyde resin; (CC)=Rosin of natural origin; (DD)=Rosin of natural origin.

As may readily be seen from each of the above examples, use of the reaction product of the reaction of the instant invention i.e., the reaction product of ozone and a compound selected from the class consisting of alkyl substituted phenolacetylene resins, alkyl substituted phenol-aldehyde type resins and rosins of natural origin results in far superior performance in connection with the increased tack of the synthetic rubber materials.

EXAMPLE VI

Compounding 1.4 formula weight masterbatches of the following compounds were prepared in the midget Banbury.

TABLE 6

|  | A | B | C | D | E |
|---|---|---|---|---|---|
| EPDM of ML4 at 250° F.=70, containing 1,4-hexadiene as termonomer | 100 | 100 | 100 | 100 | 100 |
| High abrasion furnace black | 80 | 80 | 80 | 80 | 80 |
| Naphthenic processing oil | 40 | 40 | 40 | 40 | 40 |
| Propionic acid surface coated ZnO | 5 | 5 | 5 | 5 | 5 |
| Stearic acid | 1 | 1 | 1 | 1 | 1 |
| p-t-Butyl phenol/acetylene oligomer | | 2 | 3 | .4 | 5 |

The thus prepared stock material was treated as in Example I to prepare 1″ width test strips. The cellophane-stripped specimens were exposed to air at 72° F. temperature and 50% relative humidity and/or to air containing 0.067 mg./l. ozone at a flow rate of 0.4 c./min.

TABLE 4

| Test number | Composite | p-t-Butyl phenol/acetylene oligomer, g./100 ml. | O₃ exposure, min. | T-peel, lbs. in. | Type of failure |
|---|---|---|---|---|---|
| 1 | A | (¹) |  | 3.3 | Interface separation. |
| 2 | B | (¹) |  | 2.7 | Dull surface. |
| 3 | A | 0.25 |  | 3.3 | Interface separation. |
| 4 | B | 0.25 |  | 2.9 | Dull surface. |
| 5 | A | 0.25 | 5 | 8.4 | Cohesive failure. |
| 6 | B | 0.25 | 5 | 6.2 | Do. |
| 7 | A | 0.5 | 5 | 9.8 | Do. |
| 8 | B | 0.5 | 5 | 9.8 | Do. |
| 9 | C | 0.5 | 5 | 8.5 | Do. |

¹ None. Hexane only.

These strips were then tested by the T-peel test method disclosed in Example I with the results as follows:

TABLE 7

| | A | B | C | D | E |
|---|---|---|---|---|---|
| | p-t-Butyl phenol/acetylene oligomer concentration, phr. | | | | |
| | 0 | 2 | 3 | 4 | 5 |
| Exposure | Median T-peel strength, lbs. pull/inch width | | | | |
| Air, 0 hr | 2.50S | 3.10S | 2.50S | 2.85S | 3.15S |
| Air, 4 hrs | 1.00S | 3.00S | 3.00S | 3.65S | 3.80S |
| Air, 18 hrs | 1.74S | 2.45S | 1.75S | 1.90S | 1.70S |
| Air, 48 hrs | 1.00S | 4.50S | 3.40S | 2.80S | 2.80S |
| Air, 72 hrs | 0.54S | 1.80S | 4.80S | 3.15S | 2.75S |
| Air, 72 hrs.—ozone, 15 mins | 0.08S | 12.8C | 12.8C | 13.6C | 12.4C |
| Air, 0 hr.—ozone, 5 secs | 0.30S | 2.6S | 11.3C | 10.5C | 14.7C |
| Air, 0 hr.—ozone, 10 secs | 0.22S | 10.4C | 11.8C | 14.5C | 16.8C |
| Do | 0.28S | 9.2C | 10.4C | 10.8C | 15.0C |
| Air, 0 hr.—ozone, 5 mins | 0.14S | 8.4C | 10.0C | 11.0C | 21.5C |
| Air, 0 hr.—ozone, 15 mins | | | | | 20.0 |

NOTE.—C=Cohesive failure; S=Separation at interphase.

As will readily be noted from a study of Table 7, the products which result subsequent to the treatment with ozone are far superior to those compositions which are not so treated.

EXAMPLE VII

This example offers additional demonstration of the effect of ozone in developing tack in p-t-butyl phenol/acetylene oligomer containing E.P.D.M. stock. It also demonstrates that it is necessary to have the ozonized form of p-t-butyl phenol/acetylene oligomer on both surfaces used in the T-peel test.

Stock preparation procedures closely follow those specified in Example VI. Specimen 3 is identical to 6A which is specimen A of Example VI, and contains no p-t-butyl phenol/acetylene oligomer, specimen 4 is identical to 6E and contains 5 parts p-t-butyl phenol/acetylene oligomer per 100 parts E.P.D.M.

Exposure procedure and T-peel testing procedure are the same as in Example VI.

Data in Table 8 present median pull values of T-peel test.

TABLE 8.—EFFECT OF EXPOSURE TIME ON DEVELOPING TACK

| | Exposure | | Content p-t-butyl phenol/ acetylene oligomer, phr. | T-peel strength, lbs./in. |
|---|---|---|---|---|
| | One side | Other side | | |
| Number: | | | | |
| 1 | None | None | 0 | 3.2S |
| 2 | do | do | 5 | 2.6S |
| 3 | 18 hrs. air | 18 hrs. air | 0 | 1.85S |
| 4 | do | do | 5 | 1.6S |
| 5 | 1 min. ozone | 1 min. ozone | 5 | 12.9C |
| 6 | 5 min. ozone | 5 min. ozone | 5 | 10.5C |
| 7 | 10 min. ozone | 10 min. ozone | 0 | 0.1S |
| 8 | do | do | 5 | 9.5C |
| 9 | 15 min. ozone | 15 min. ozone | 0 | 0.1S |
| 10 | do | do | 5 | 16.2C |
| 11 | do | do | 0, 5 | 0.7S |
| 12 | None | do | 0, 5 | 0.4S |
| 13 | 15 min. ozone | None | 0, 5 | 0.3S |

NOTE.—S=Surface separation; C=Cohesive failure.

Stock materials were prepared according to the method of Example VI so as to demonstrate the effect of ozone on the development of tack in an E.P.D.M. stock. The exposure procedure and T-peel testing procedure were those followed in Example VI. As may be seen from Table 8, subsequent to the treatment of ozone, the result is a far improved tack.

EXAMPLE VIII

Specimens were prepared according to the method of Example VI so as to demonstrate the variety of resins to which the instant process is applicable. The resins were employed in amounts of five parts per one hundred parts of rubber concentration. As may readily be seen from Table 9, subsequent to the treatment with ozone, the composition exhibits far superior tack.

TABLE 9.—MEDIAN T-PEEL STRENGTH VALUES FOR TACKIFIERS

| | Median T-peel values, lbs./inch width | | | | |
|---|---|---|---|---|---|
| | Air exposure after— | | Ozone exposure after— | | |
| Tackifier used | 0 hr. | 18 hrs. | 10 sec. | 5 min. | 15 min. |
| None | 2.6S | 1.4S | .28S | .28S | .15S |
| Substituted phenolacetylene resin | 2.4S | 1.8S | 11.2C | 11.5C | 10.6C |
| Rosin of natural origin | 2.1S | 2.1S | 8.9C | | |
| Substituted phenolaldehyde resin | 2.4S | 2.2S | 1.6S | 11.5C | 10.6C |
| Rosin of natural origin | 1.9S | 1.2S | 1.8S | 8.1C | 11.8C |
| o-t-Butylphenol novolak | 3.2S | 3.1S | 1.5S | 16.5C | |
| Modified alkyl phenol novolak | 1.6S | 1.1S | 15.3C | | |

NOTE.—S=Indicates surface separation; C=Indicates cohesive failure.

EXAMPLE IX

The following preparations were prepared, so as to demonstrate the utility of the instant composition in the presence of accelerators; by the procedure of Example VI by including the amounts of tackifier and accelerators given in Table 10 in a masterbatch of the composition given in Table 6 Column A of Example VI above.

TABLE 10

| | A | B | C | D | E | F |
|---|---|---|---|---|---|---|
| Compounding ingredients, phr.: | | | | | | |
| p-t-Butyl phenol/acetylene oligomer | 5 | 5 | 5 | 5 | 5 | 5 |
| Copper dimethyl dithiocarbamate | 1.5 | | | | | |
| Tetramethylthiuram monosulfide | | 1.5 | | | | |
| Tetramethylthiuram disulfide | | | 1.5 | | | |
| Tellurium diethyldithiocarbamate | | | | 1.5 | | |
| Zinc dimethyldithiocarbamate | | | | | 1.5 | |
| Mercaptobenzthiozole | 0.75 | 0.75 | 0.75 | 0.75 | 0.75 | 0.75 |
| Sulfur | 1.5 | 1.5 | 1.5 | 1.5 | 1.5 | 1.5 |
| T-peel test results, lbs./inch width at exposures— | | | | | | |
| 1 hr., air | 2.4S | 3.2S | 2.0S | 2.7S | 2.3S | 2.3S |
| 18 hr., air | 1.8S | 3.0S | 2.2S | 3.0S | 1.9S | 1.5S |
| 30 sec., ozone | 0.2S | 1.8S | 1.0S | 12.5C | 2.6S | 13.7C |
| 5 min., ozone | 0.3S | 0.6S | 7.3C | 15.7C | 20.8C | 16.8C |
| 15 min., ozone | 0.1S | 0.1S | 13.6C | 18.8C | 18.2C | 22.0C |

NOTE.—S=Surface spearation; C=Cohesive failure.

As will readily be seen, the invention has generally been found to be highly useful in the presence of accelerators, however, some accelerator materials do, as previously noted, interfere due to "blooming" of the acelerator. Thus, presence of tetramethylthiuram monosulfide prevented the development of tack at any ozone exposures applied. Specimens C and E did not develop tack at 30 sec. zone exposure, but higher exposures resulted in the desired improvement.

In a separate test an identical set of specimens was prepared. After exposure to ozone containing air for 5 minutes, the specimens were not subjected to the T-peel test, but were vulcanized in an air circulating oven. After vulcanization, the specimens were permanently bonded together, and could not be separated at or near the interphase. This test proves that the application of the tackifying system does not interfere with the subsequent vulcanization process.

EXAMPLE X

Following the procedure of Example VI and using the same amounts om materials compositions were prepared employing various ethylene propylene diene monomer rubbers with (5) of p-t-butyl phenol/acetylene oligomer so as to demonstrate the effectiveness of the instant process on said compositions as will readily be seen from Table 11. The instant process is useful in connection with numerous synthetic rubber materials which are resistant to the effects of ozone. Specimen preparation and testing procedures were the same as in Example IX.

TABLE 11

| EPDM elastomer used | Air, 18 hrs. | Ozone after— | | |
|---|---|---|---|---|
| | | 5 sec. | 10 sec. | 30 sec. |
| Ethylene-propylene-1,4 hexadiene terpolymer. | 1.8S | | 19.7C | 20.9C |
| Ethylene-propylenemethylene norbonene terpolymer. | 2.5S | | 6.3C | 6.3C |
| Ethylene-propylene-dicyclopentadiene terpolymer 302. | 2.0S | | 3.8S | 11.5C |
| Ethylene-propylene-dicyclopentadiene terpolymer 306. | 3.2S | 8.8C | 9.6C | 9.7C |
| E.P.D.M. (Montecatini's Dutral S). | 3.5S | 5.9C | | |

NOTE.—S = Separation of interface; C = Cohesive failure.

What is claimed is:

1. A composition comprising an ethylene propylene diene rubber and tackifier therefor, said tackifier comprising the reaction product of ozone and a compound selected from the resin group consisting of alkyl substituted phenol acetylene resins having the following formula:

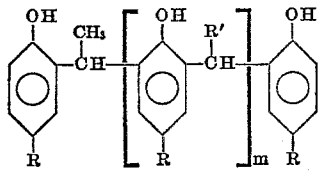

wherein R is alkyl, R' is hydrogen or lower alkyl and m has a value from about 2 to about 10 and alkyl substituted phenol aldehyde resins having the following formula:

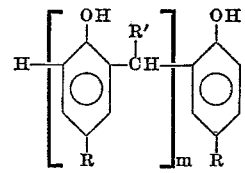

wherein R is alkyl, R' is hydrogen or lower alkyl and m has a value of from 1 to 100.

2. The composition of claim 1 wherein the tackifier is selected from the group comprising the reaction products of ozone and alkyl substituted phenol-acetylene resins.

3. The composition of claim 1 wherein the tackifier is present in an amount of from about 0.1 to about 20 parts of condensation products per 100 parts of rubber stock.

4. The composition of claim 1 wherein the tackifier is present in an amount from about 1.5 to about 7 parts of condensation product per 100 parts of rubber stock.

5. The method of imparting building tack to an E.P.D.M. rubber stock which comprises coating the surface of said rubber with a resin selected from the group consisting of alkyl substituted phenol acetylene resins having the following formula:

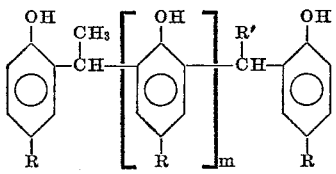

wherein R is alkyl, R' is hydrogen or lower alkyl and m has a value from about 2 to about 10 and alkyl substituted phenol aldehyde resins having the following formula:

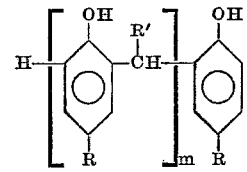

wherein R is alkyl, R' is hydrogen or lower alkyl and m has a value of from 1 to 100 and subsequently contacting the said coated rubber surface with ozone.

References Cited
UNITED STATES PATENTS 3,062,761   11/1962   Spacht _____ 260—3
3,026,297   3/1962   Spacht _____ 260—48.95

MURRAY TILLMAN, Primary Examiner

C. J. SECCURO, Assistant Examiner

U.S. Cl. X.R.

260—3, 19, 23.5 A, 27, 53, 59, 848